(12) United States Patent
Andre et al.

(10) Patent No.: US 6,861,785 B2
(45) Date of Patent: Mar. 1, 2005

(54) SELF-POWERED REMOTE CONTROL DEVICE, ELECTRICAL APPARATUS AND INSTALLATION COMPRISING SAME

(75) Inventors: Philippe Andre, Fontaine (FR); Patrick Almosnino, St Nizier du Moucherotte (FR); Gilles Cortese, St Marcellin (FR); Roland Moussanet, Notre Dame de Commiers (FR); Patrick Rousset, Saint Cassien (FR)

(73) Assignee: Schneider Electric Industries SA (FR)

( * ) Notice: Subject to any disclaimer, the term of this patent is extended or adjusted under 35 U.S.C. 154(b) by 189 days.

(21) Appl. No.: 10/149,384

(22) PCT Filed: Nov. 30, 2000

(86) PCT No.: PCT/FR00/03339

§ 371 (c)(1),
(2), (4) Date: Jun. 12, 2002

(87) PCT Pub. No.: WO01/45139

PCT Pub. Date: Jun. 21, 2001

(65) Prior Publication Data

US 2002/0190610 A1 Dec. 19, 2002

(30) Foreign Application Priority Data

Dec. 16, 1999 (FR) .............................. 99 15893

(51) Int. Cl.⁷ ............................................. H01L 41/08
(52) U.S. Cl. ........................ 310/339; 310/317; 310/319
(58) Field of Search ................................... 310/319, 339

(56) References Cited

U.S. PATENT DOCUMENTS

| | | | | |
|---|---|---|---|---|
| 3,056,932 A | * | 10/1962 | Wood .......................... 331/185 |
| 3,366,808 A | * | 1/1968 | Steward ....................... 310/326 |
| 3,541,360 A | * | 11/1970 | Tonari ......................... 310/339 |
| 3,553,588 A | * | 1/1971 | Honig ....................... 455/127.1 |
| 4,499,394 A | * | 2/1985 | Koal ........................... 310/330 |
| 4,612,472 A | * | 9/1986 | Kakizaki et al. ............. 310/339 |
| 4,761,582 A | * | 8/1988 | McKee ........................ 310/322 |
| 4,814,661 A | * | 3/1989 | Ratzlaff et al. ............. 310/328 |
| 4,853,580 A | * | 8/1989 | Sula ............................ 310/339 |
| 5,065,067 A | * | 11/1991 | Todd et al. .................. 310/339 |
| 5,266,863 A | * | 11/1993 | Nonami et al. ............. 310/339 |
| 5,315,204 A | * | 5/1994 | Park ............................ 310/339 |
| 5,339,051 A | * | 8/1994 | Koehler et al. ............... 331/65 |
| 5,554,907 A | * | 9/1996 | Dixon ......................... 310/339 |
| 5,801,475 A | * | 9/1998 | Kimura ....................... 310/319 |
| 5,844,516 A | | 12/1998 | Viljanen | |
| 5,988,646 A | * | 11/1999 | Fair ............................ 273/371 |

FOREIGN PATENT DOCUMENTS

| | | |
|---|---|---|
| DE | 197 55 820 | 6/1999 |
| FR | 2198670 | 3/1974 |
| GB | 1 426 492 | 2/1976 |
| WO | 97/44883 | 11/1997 |

* cited by examiner

Primary Examiner—Mark Budd
(74) Attorney, Agent, or Firm—Parkhurst & Wendel, L.L.P.

(57) ABSTRACT

The invention concerns a self-powered remote control device comprising transmitting means, a feeder circuit connected to said transmitting means, a generator supplying electric power connected to the feeder circuit, and control means associated with the electric power generator. The generator comprises at least a piezoelectric element receiving mechanical stresses produced by actuating the control means and supplying electric power to the feeder circuit. The invention also concerns an apparatus comprising at least a self-contained control device actuated by a mechanical action member. The invention further concerns an electric installation comprising means for receiving signals transmitted by at least a self-powered control device.

26 Claims, 6 Drawing Sheets

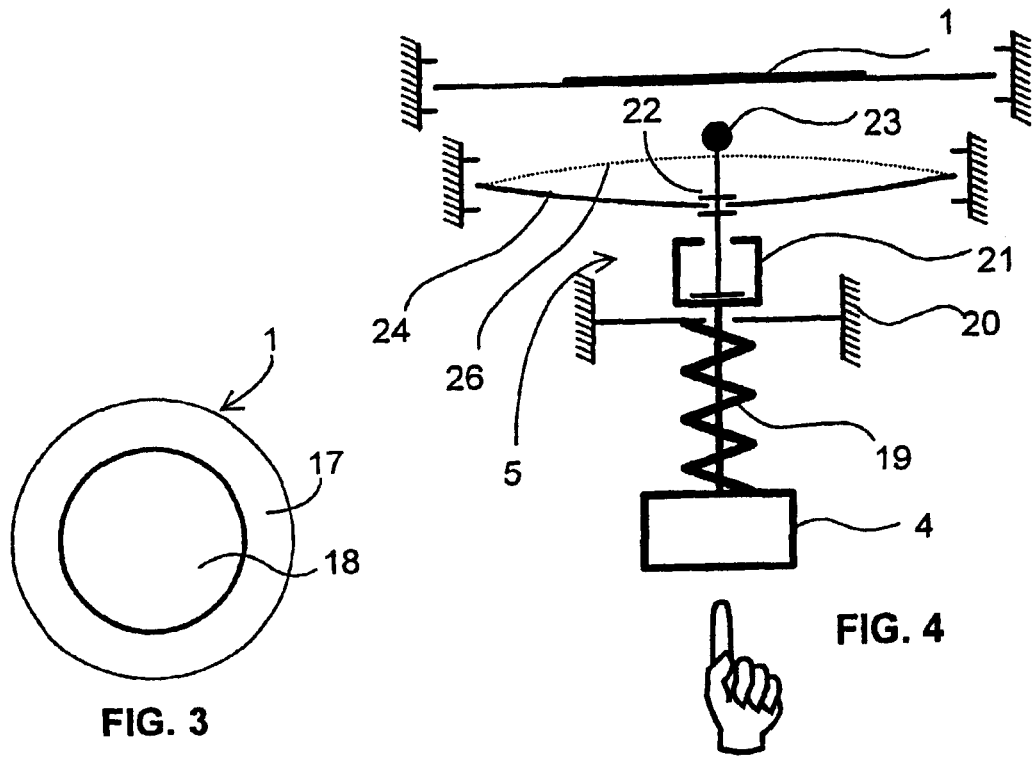
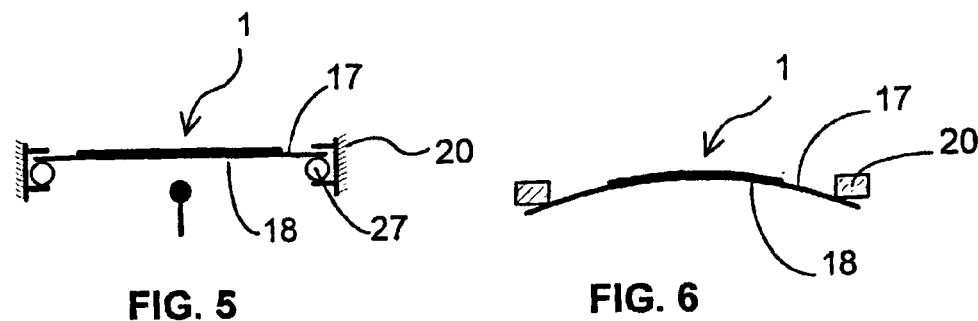
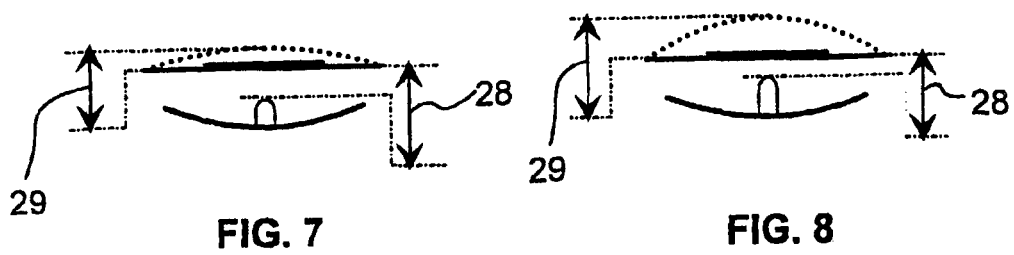
FIG. 3
FIG. 4
FIG. 5
FIG. 6
FIG. 7
FIG. 8

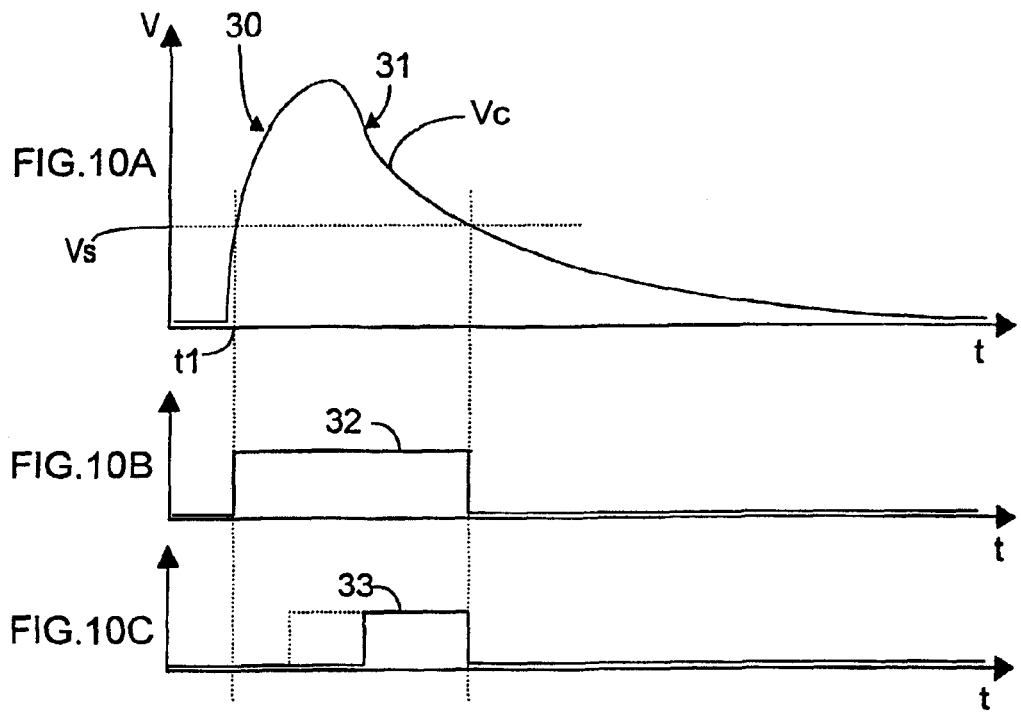
FIG. 10A
FIG. 10B
FIG. 10C
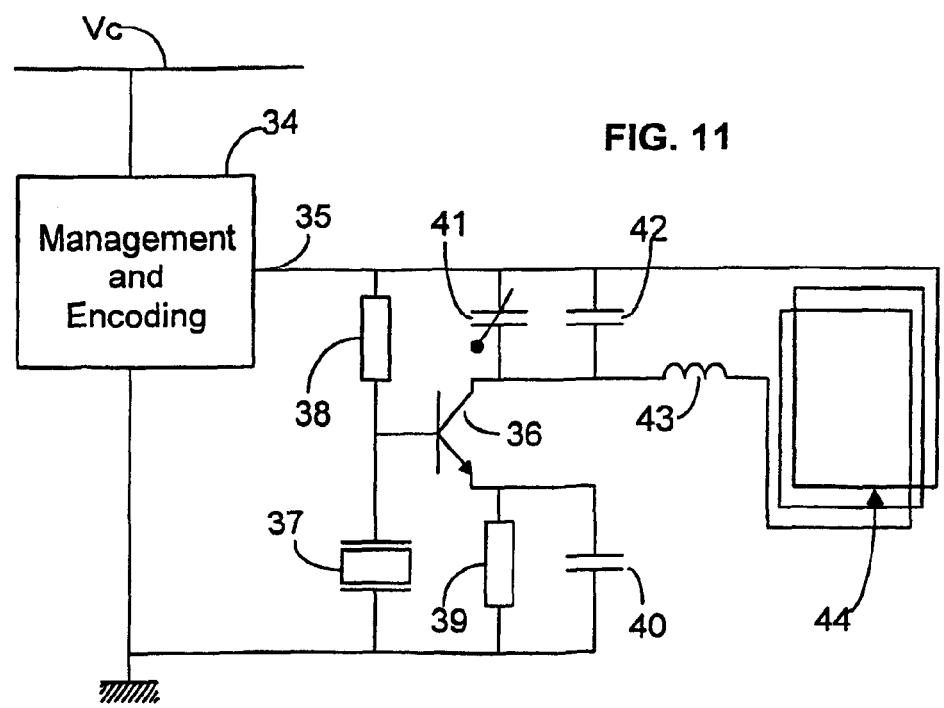
FIG. 11

SELF-POWERED REMOTE CONTROL DEVICE, ELECTRICAL APPARATUS AND INSTALLATION COMPRISING SAME

BACKGROUND OF THE INVENTION

The invention relates to a self-powered remote control device comprising:
- transmission means,
- a feeder circuit connected to the transmission means,
- a generator supplying electric power connected to the feeder circuit, and
- control means associated to the electric power generator.

Known remote control devices generally comprise a transmitter and a receiver to control an electrical apparatus. Transmitters of known type have electronic circuits enabling a high frequency, infrared or ultrasonic electromagnetic radiation to be emitted. The radiation emitted by the transmitters is preferably modulated and encoded to provide satisfactory operating safety when several transmitters and receivers are used.

The receivers receive the emitted radiation, then detect and decode the signal received. The decoded signal is used by electronic circuits to control in particular electrical apparatuses.

Fixed or mobile self-powered transmitters generally require a power supply provided by disposable or rechargeable batteries. Management of replacement of the batteries makes the use of self-powered transmitters extremely constraining. Furthermore, frequent use of the transmitters leads to rapid discharge of the batteries and consequently to frequent replacements and a high operating cost. Self-powered transmitters are also liable to present defects or to stop functioning if the batteries are discharged or missing.

Devices exist whose generator is an oscillating magnetic circuit. However the power supplied by such generators is low and the remote control devices are bulky. A device of this type is described in U.S. Pat. No. 4,471,353.

Other devices comprising an electromagnetic generator with higher performance are described in the European Patent application EP-0,826,166. However, in these devices the volume can not be sufficiently reduced for them to be integrated in apparatuses of small dimensions.

SUMMARY OF THE INVENTION

The object of the invention is therefore to achieve a remote control device comprising a self-powered transmitter able to occupy a small volume.

In a self-powered remote control device according to the invention, the generator comprises at least one piezoelectric element receiving mechanical stresses produced by actuation of the control means and supplying electric power to the feeder circuit.

In a preferred embodiment, the feeder circuit comprises electric power storage means to store electric power supplied by the piezoelectric element.

In a particular embodiment, the control means comprise means for calibrating mechanical energy to strike the piezoelectric element with a predetermined mechanical impact and travel.

Advantageously, the means for calibrating mechanical energy comprise at least one spring leaf having two stable states to command a calibrated movement of a striker when a changeover position is passed.

Preferably, the piezoelectric element comprises a flexible metal support and a pad made of piezoelectric material arranged on one face of said support.

Advantageously, the control means strike the piezoelectric element on the opposite side from the pad.

According to a first alternative embodiment, the flexible metal support is held freely in a housing designed to receive it.

According to a second alternative embodiment, the flexible metal support is secured by means of a seal arranged on a rim directed towards the face of said support comprising the pad.

Preferably, the piezoelectric material of the pad is essentially composed of ceramic or copolymer.

Advantageously, the piezoelectric element has a mechanical resonance to increase the duration of electric power supply to the feeder circuit.

For high efficiency, the means for storing electric power comprise at least one electric capacitor, the capacity of the storage means being between 0.4 and 50 microfarads.

Particularly, the capacity of the storage means has a value between 2 and 10 microfarads.

In a preferred embodiment, the device comprises electric power management means connected to the feeder circuit to control an initialization and encoding phase and a transmission phase.

In a particular embodiment, the transmission means comprise emitter means and receiver means.

Advantageously, the transmission means comprise emitter means supplied by an output port of an integrated circuit.

Preferably, the device comprises storage means connected to the transmission means.

Preferably, the device comprises counting means connected to the transmission means.

Preferably, the transmission means comprise transmission condition checking means.

An apparatus according to an embodiment of the invention comprises a mechanical actuating means and a self-powered remote control device as defined above, said means being able to actuate the control means associated to the power generator.

In a particular embodiment, the apparatus is an electrical switchgear apparatus comprising mechanical actuating means to actuate the control means according to the state of said switchgear apparatus.

In an apparatus according to a particular embodiment, the transmission means emit signals usable to perform logic selectivity.

In an apparatus according to a preferred embodiment, the transmission means emit signals usable to perform differentiated annunciation.

Advantageously, the transmission means emit signals representative of a number of operations of said apparatus.

In a particular embodiment, the apparatus is an electrical control apparatus comprising mechanical actuating means able to be actuated by an operator.

In a particular embodiment, the apparatus is an electrical control apparatus comprising mechanical actuating means able to be actuated by a movement of a mechanical device.

An electrical installation according to an embodiment of the invention comprises high-frequency receiver means and at least one self-powered remote control device as defined above, said receiver means being designed to receive signals emitted by said at least one self-powered device.

Advantageously, the electrical installation comprises at least one electrical cabinet containing at least one self-powered remote control device as defined above, and an automatic control circuit connected to the receiver means.

Preferably, the electrical installation comprises at least one apparatus as defined above.

BRIEF DESCRIPTION OF THE FIGURES

Other advantages and features will become more clearly apparent from the following description of particular embodiments of the invention given as non-restrictive examples only and represented in the accompanying drawings in which:

FIG. 3 represents a piezoelectric pad of a device according to an embodiment of the invention;

FIG. 4 represents a diagram of a calibrating device of an impact on a piezoelectric element for a device according to an embodiment of the invention;

FIGS. 5 and 6 show holding and flexion of a piezoelectric element on a command impact;

FIGS. 7 and 8 show impact and stress distances of piezoelectric elements for self-powered remote control devices according to embodiments of the invention;

FIGS. 10A to 10C illustrate curves representative of signals for electric power management;

FIG. 11 represents a diagram of a high-frequency head used in a device according to an embodiment of the invention;

Figure 1:
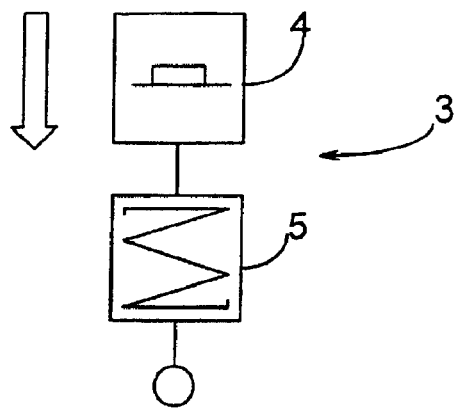
FIG. 1 represents a diagram of a self-powered remote control device according to an embodiment of the invention.
Figure 1:
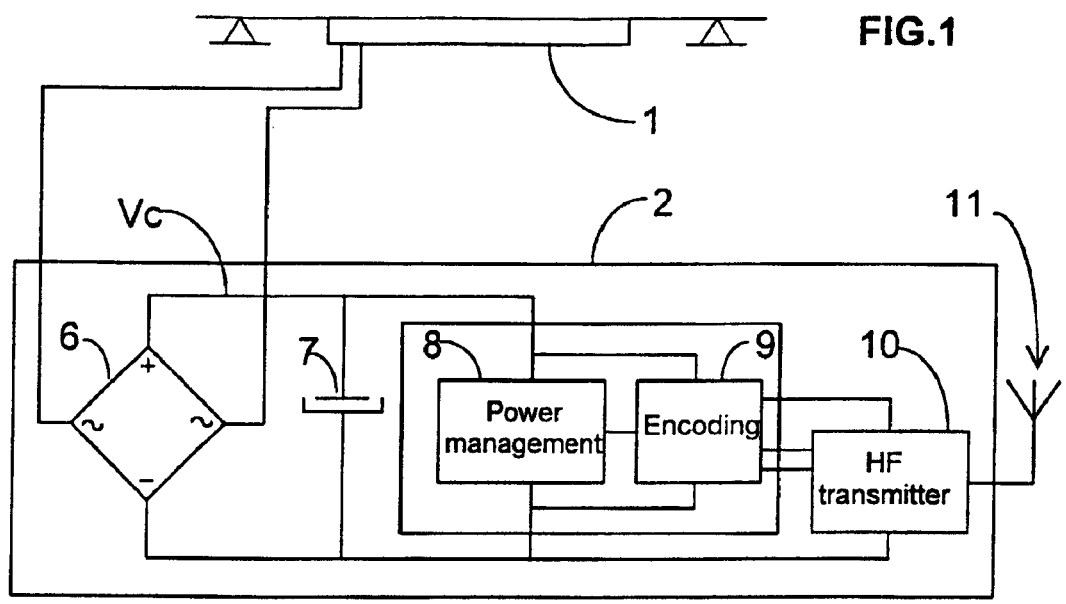

A remote control device according to an embodiment of the invention is represented in FIG. 1. The device comprises a piezoelectric element 1 to supply electric power to an electronic transmission processing circuit 2.

DETAILED DESCRIPTION OF THE PREFERRED EMBODIMENTS

The piezoelectric element 1 supplies electric power when an impact or a mechanical stress is applied to said piezoelectric element.

In FIG. 1, control means 3 enable a calibrated impact to be applied to the piezoelectric element. The control means comprise for example a press-button 4 that actuates a calibrating device 5 of the mechanical energy so as to strike the piezoelectric element with a predetermined impact and travel.

The electric power produced by the piezoelectric element is applied to the electronic circuit 2 which comprises, in this embodiment, a rectifier bridge 6 connected to the element 1 and supplying a rectified current, a capacitor 7 connected on output from the bridge to store the electric power by accumulating the rectified current and to supply a DC voltage Vc to an electric power management circuit 8. The management circuit 8 controls an encoding circuit 9 to initialize and transmit information. A high-frequency transmitter 10 connected to the encoding circuit emits encoded high-frequency signals by means of an antenna 11. Encoding of the signals serves in particular the purpose of identifying the transmitting device. The transmitter 10 can also comprise receiver means to receive for example parameter setting information during power supply.

Figure 2:
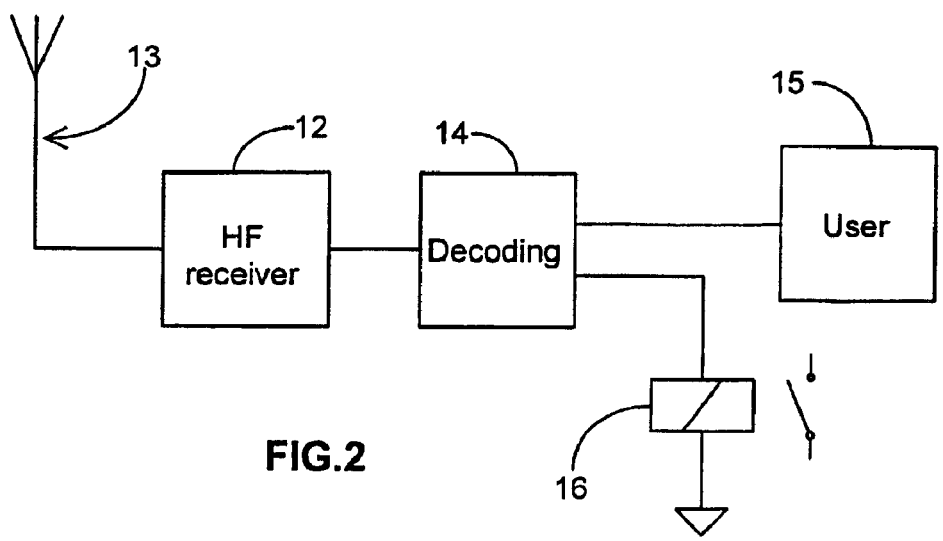
FIG. 2 represents a receiver device able to operate with a device according to an embodiment of the invention.

FIG. 2 represents a receiver device able to operate with a device according to FIG. 1. The receiver device comprises a high-frequency receiver 12 receiving signals picked up by an antenna 13 and supplying signals to a decoding circuit 14. The circuit 14 supplies decoded signals to a user device 15 or for example to actuators 16 such as relays. The user device can for example be a data processing unit, an automatic controller, an industrial process or a communication network.

An example of structure of a piezoelectric element is represented in FIG. 3. In this example, the piezoelectric element comprises a flexible metal support 17 on which a pad made of piezoelectric materials is fixed. The pad 18 is preferably made of ceramic or copolymer presenting high efficiencies.

A calibrating device for calibrating an impact on a piezoelectric element is represented in FIG. 4. A push-type button 4 is kept in a rest position by a return spring 19 that presses on a body 20 of the device. A fork 21 fixedly secured to the button enables movement of a striker device 22 comprising an impact end 23 to be commanded to strike the pad of the piezoelectric element. In this embodiment, the impact calibrating device comprises a bistable spring leaf 24 held in the body 20 and associated to the device 22.

At rest, the spring leaf 24 is in a first position 25 away from the pad. When the button 4 is actuated, the fork 21 presses on the striker device 22 which moves the spring leaf 24 with it. As soon as the movement of the leaf passes a mid-way changeover position, the leaf moves suddenly to a second stable position 26. In moving to the second position, the leaf drives the striker device 22 towards the element 1 and the impact end 23 strikes the piezoelectric element. The characteristics concerning the mechanical impact on the piezoelectric element and the mechanical travel of the striker device are thus dependent on the spring leaf and the distance with respect to the piezoelectric element. The button can be operated either quickly or slowly. The spring leaf stores energy when it is moved between the first stable position 25 and a changeover position. The energy stored by deformation of the leaf is then released when the leaf moves to the second stable position 26. When the impact with the piezoelectric element takes place, the mechanical energy is converted into electric power by the pad 18.

When the button 4 is no longer pressed, the return spring 19 moves the button 4 and fork 21 to a rest position. In moving, the fork moves the striker device 22 and the spring leaf fixedly secured to said device 22 back to the first stable position 25.

Advantageously, the mechanical impact against the piezoelectric element is performed on the opposite side from the pad. The electric power over mechanical energy efficiency is thus higher, as is the dependability.

In FIG. 5, a piezoelectric element is arranged in a support 20 so as to be held in place. In this embodiment, a seal 27 is fitted between the support 17 of the piezoelectric element and the support 20 to separate front and rear parts of said element. The seal 27 is advantageously fitted on the same side as the element 1 that receives the mechanical impact so as to ensure a high efficiency. In FIG. 5, the pad 18 is also on the side that receives the impact to recover a high electric power. An efficiency is high when the piezoelectric element 1 is deformed against a rigid support 20. Such an arrangement is represented in FIG. 6 where the support 17 rests on a rigid support 20 on the opposite side from that of the pad 18 receiving the mechanical impact.

Advantageously, the characteristics of the mechanical impact can be adjusted according to the characteristics of the piezoelectric element used and to the quantity of electric power to be collected. FIGS. 7 and 8 show distances of travel of a striker device. In FIG. 7, a travel distance 28 is large but the deformation 29 of the element 1 is small as the impact takes place at the end of travel. In FIG. 8, a travel distance 28 is small but the deformation 29 is large as the impact takes place before the end of travel. Adjustment of the distance to suit the type of piezoelectric element also enables a high efficiency and a large number of operations to be guaranteed.

Depending on the fixing mode of the piezoelectric element on a support, a mechanical resonance enables the duration of electric power supply to the electronic circuit 2 to be increased.

Figure 9A:
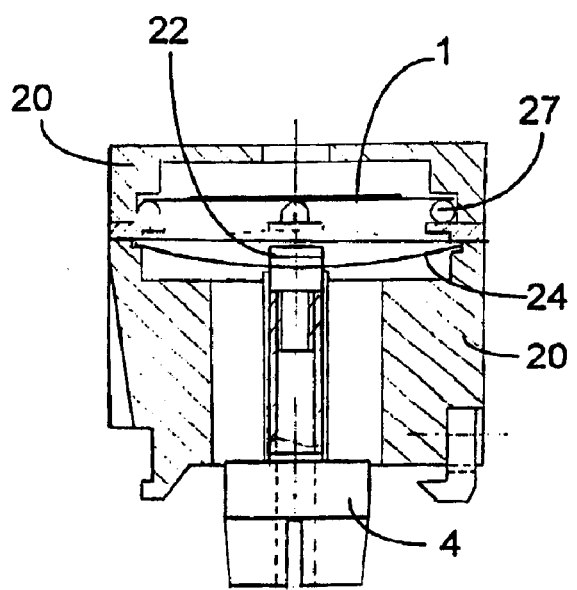
FIGS. 9A and 9B represent sectional views of a push-button comprising a device according to an embodiment of the invention.
Figure 9B:
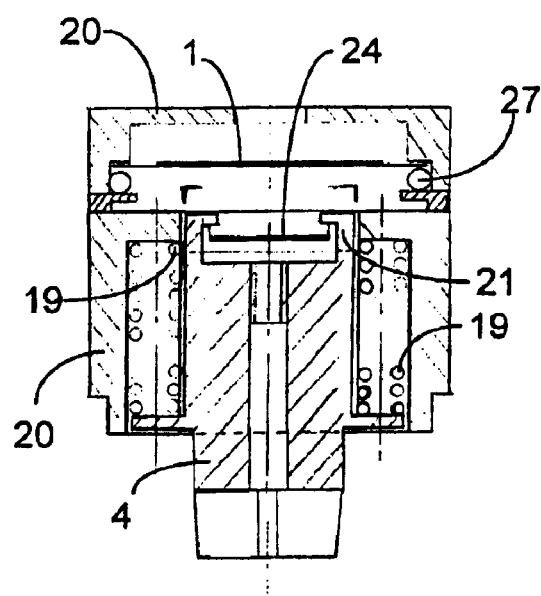

FIGS. 9A and 9B show sectional views of an electrical control apparatus according to an embodiment of the invention such as a push-button comprising a self-powered remote control device. In the embodiment, the element 1 is secured by means of an O-ring 27 and the press-key 4 of the push-button is biased to its rest position by two return springs 19.

The electric power storage means such as the capacitor 7 are adapted to match the characteristics of the piezoelectric element, the electronic circuit load, and the transmission time. In one embodiment of the invention, the capacitor has a value comprised between 0.4 and 50 microfarads ($\mu$F). The capacity of the storage means preferably has a value of 2 to 10 microfarads ($\mu$F).

The voltage of the capacitor is applied to a power management circuit 8 to control an initialization and encoding phase and a transmission phase. FIGS. 10A to 10C show operation of a power management circuit 8 according to an embodiment of the invention.

In FIG. 10A, the curve represents a voltage Vc on the feeder capacitor 7 of the management circuit 8 when the piezoelectric element receives a mechanical command impact. The voltage Vc has an increase 30 followed by a decrease 31. When the voltage Vc increases and exceeds a threshold Vs at a time t1, the management circuit controls an encoding circuit 9. The operating state of the encoding circuit is represented by a curve 32 in FIG. 10B. After the encoding circuit command, the management circuit commands operation of the high-frequency transmitter. A curve 33 in FIG. 10C shows the operating time of the high-frequency transmitter 10. The transmitter 10 can be commanded for example within a preset time delay after command of the encoding circuit as soon as the increase of the voltage Vc is no longer large or as soon as the voltage Vc starts decreasing.

In a preferred embodiment represented in FIG. 11, the circuits 8 and 9 can be integrated in a single circuit 34 achieved in digital and/or analog form.

Control of the high-frequency transmitter is advantageously achieved by an output 35 of the circuit 34 which supplies an oscillator. The electric power is thus saved to guarantee a sufficient and dependable transmission time.

In FIG. 11, the oscillator is achieved with a transistor 36 and an oscillating circuit 37 composed of a quartz or a ceramic resonator. Polarization of the base is performed by a resistor 38 and polarization of the transmitter is performed by a resistor 39 decoupled by a capacitor 40. On the collector of the transistor 36 a tuning circuit comprising two capacitors 41 and 42, an inductance 43 and a loop antenna 44 enable a high-frequency radiation to be emitted. The capacitor 41 is preferably of the adjustable type so as to adjust the tuning of the circuit.

The antenna 11 or 44 is adapted to the distance between the transmitter and receiver. Preferably for short distances of a few meters, the transmitting frequency is lower than 400 MHz and transmission is near field. Advantageously the magnetic field will be used with a tuned loop antenna.

Figure 12:
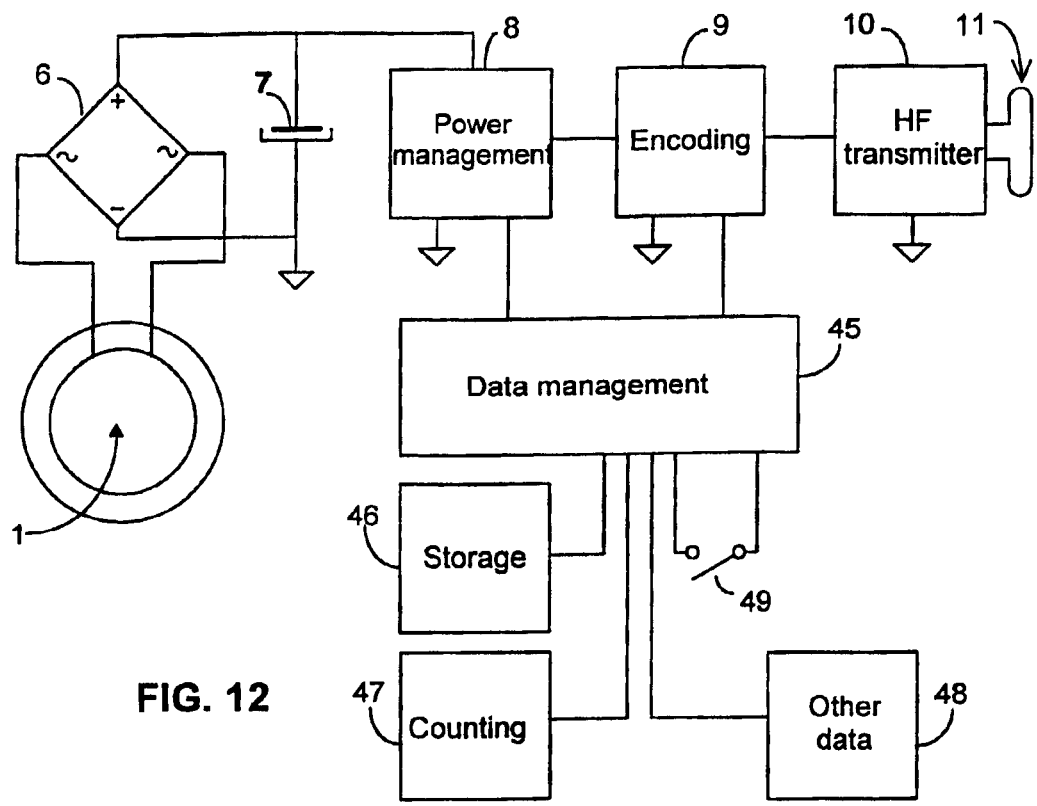
FIG. 12 represents a diagram of a self-powered remote control device according to another embodiment of the invention.

FIG. 12 shows a detailed embodiment of a device according to the invention comprising a data management circuit 45. In the diagram of FIG. 12, a storage circuit 46, a counting circuit 47, a parameter setting circuit 48 comprising other data and/or at least one electric contact 49 can be connected to the data management circuit.

Depending on the application in which the device is integrated, the storage circuit can for example store message sending conditions, data to be sent or the application identification.

The counting circuit 47 is used in particular to count the number of commands made on the piezoelectric element. When the device is integrated in an electrical apparatus such as circuit breakers, switches, or contactors, actuations of the mechanism of this apparatus on the piezoelectric element enable openings or closings of the electrical contacts of said apparatus to be counted.

For example in a circuit breaker comprising a device according to an embodiment of the invention, the counter increments its value to be transmitted at each operation of the circuit breaker. In association with sending conditions stored in the storage circuit, a control device can send counting data as soon as a preset number of counted events is reached or exceeded. In addition, the counted values can be stored in the storage circuit. The storage circuit can also be associated to various counting/metering devices such as movement counters, automatic controllers, rotating machines, to-and-fro movement machines, fluid or electricity meters with telemetering. Fluid meters such as gas, hot water or cold water meters with telemetering do not in this case require any external electric power. In this case the self-powered remote control device sends the metering data and an identification frame of the device and/or user. A receiver recovers the data and processes it or sends it to a concentrator or a central unit.

A parameter setting circuit 48 enables other data to be provided which may be awaiting a command to be transmitted. For example, in a circuit breaker the circuit 48 can receive information of the type of fault that is occurring. Then, as soon as tripping takes place or an operation is performed, mechanical energy is given to the remote control device which sends information present in the circuit 48. The information can concern the differentiated fault display functions, logic selectivity functions or for example circuit breaker status reports for example the open, closed, tripped or loaded states.

The electric contact 49 can also serve the purpose of giving information to be transmitted when the remote control device is actuated, for example it can be associated to command of the piezoelectric element 1 to indicate the command performed. For example, the contact 49 can indicate that the button 4 is associated to an opening or closing contact function. Likewise, if the button 4 is replaced by a rotary knob of the switch type with at least two positions, the switch 49 can be representative of the change of direction or of the change of state of the button, for example open or closed position. The button 4 can also be replaced by a means of lever type actuating the piezoelectric element on each change of state or position. The remote control device can also be integrated in an end-of-travel detection device in automated installations, the mechanical energy being provided by the movement of a mechanical element.

Figure 13:
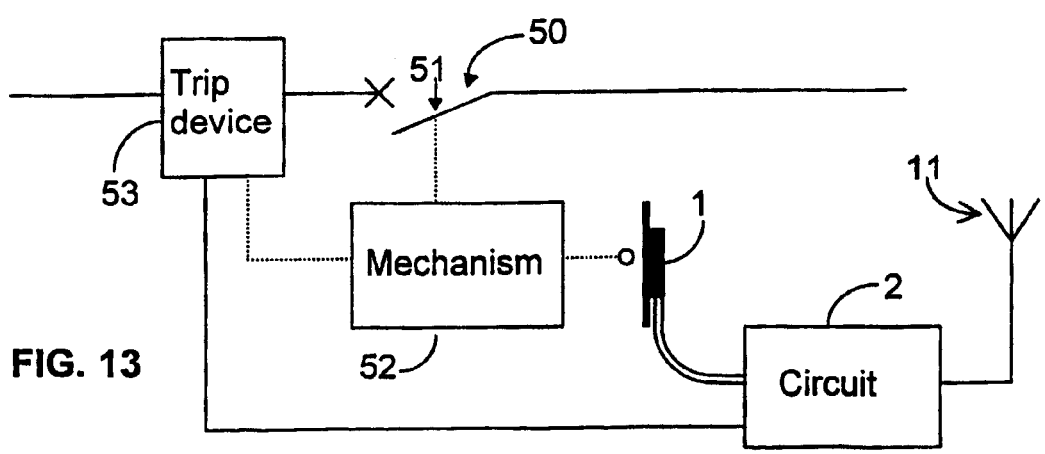
FIG. 13 represents a circuit breaker according to an embodiment of the invention comprising a self-powered remote control device.

Other electrical apparatuses according to embodiments of the invention such as circuit breakers, switches or contactors are equipped with mechanisms that can actuate a self-powered remote control device. The diagram of a circuit breaker 50 according to an embodiment of the invention comprising a remote control device is represented in FIG. 13. The circuit breaker 50 comprises at least one power contact 51 actuated by means of a mechanism 52. A trip device 53 commands the mechanism 52 according in particular to preset current and time characteristics. For example, if a current threshold is exceeded for a preset time, the trip device 53 commands the mechanism 52 to trigger opening of the circuit breaker. The mechanism 52 uses mechanical energy that can also be supplied in the form of an impact or deformation to the piezoelectric element 1 of a self-powered remote control device. In the diagram of FIG. 13 the mechanism 52 strikes the element 1, however this element can also be actuated by the power contacts 51 or by a relay of the trip device 53. A calibrating device 5 can also be used to optimize the electrical efficiency of the remote control device. In the circuit breaker, the control device can be connected to the trip device 53 to transmit information usable for logic selectivity functions, for differentiated annunciation functions and/or for circuit breaker status report functions, for example closed, open, or tripped state. The logic selectivity function may require a signal receive function to indicate opening of a down-line circuit breaker to the trip device. In this case, the receive function can be integrated in the circuit 2 and the connection with the trip device can be two-way. The electronic circuit 2 can also receive electric power from the trip device for continuous transmissions, the supply of mechanical energy being essentially reserved for mechanical opening or closing actions and when the circuit breaker is not supplied with power.

Figure 14:
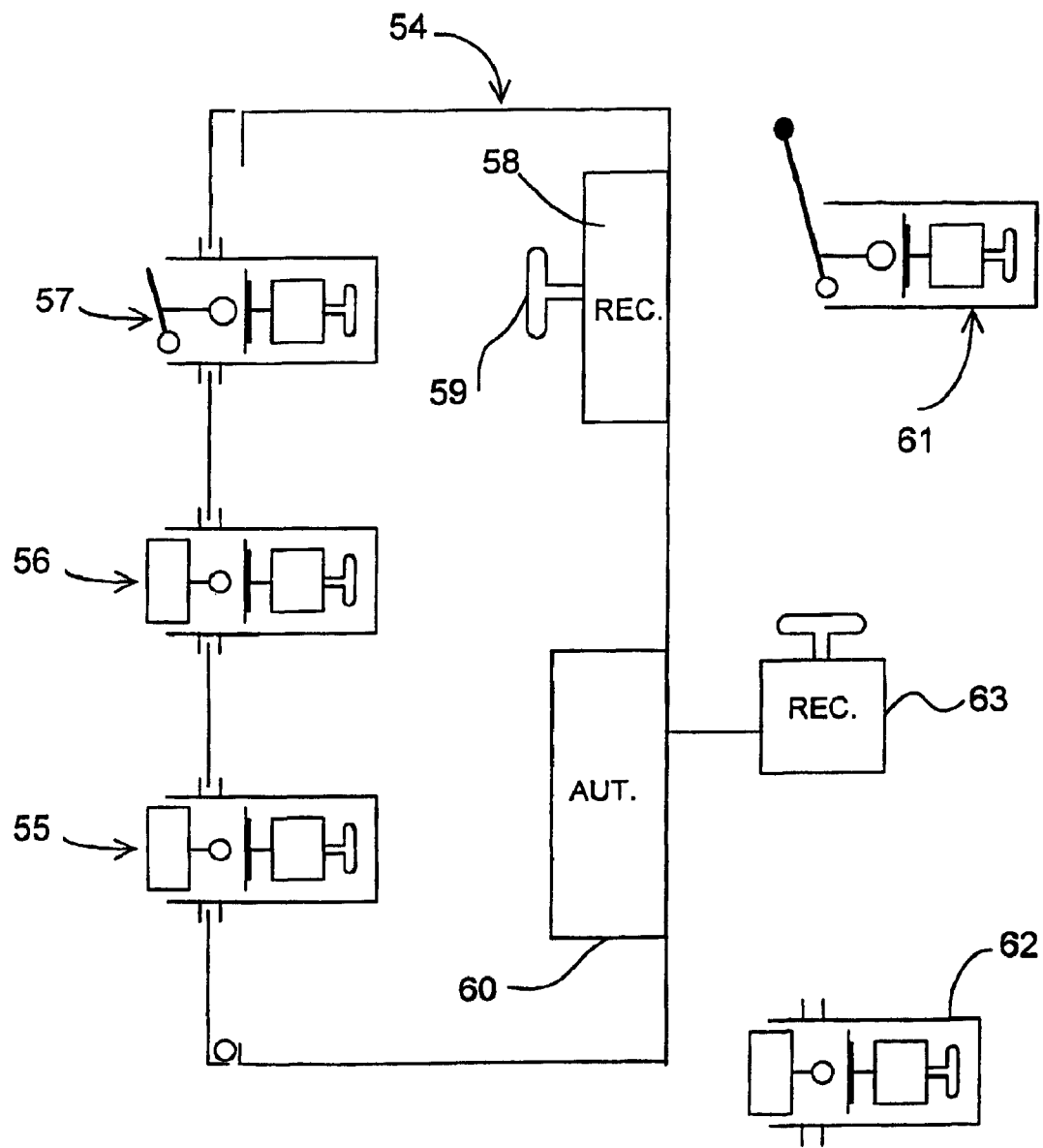
FIG. 14 represents a diagram of an installation according to an embodiment of the invention comprising self-powered remote control devices.

FIG. 14 shows an installation according to an embodiment of the invention comprising self-powered remote control devices. In this installation, an electrical cabinet 54 contains devices 55 and 56 having a push-button type control button, like that of FIG. 1 for example, a device 57 having a switch type control, and a receiver device 58 like that of FIG. 2 with a receiver antenna 59. The device 58 can be connected to the automatic control circuit 60 such as hardwired logic circuits, programmed logic circuits, and/or a programmable controller.

Outside the cabinet 54 self-powered remote control devices can be used for other functions. For example a device 61 can be a mechanical end-of-travel detector or a movement detector, and a device 62 can be an Off, an emergency stop, or an On button. The devices 61 and 62 can communicate with a receiver 63 connected to the automatic control circuit 6.

Other functions or apparatuses can comprise self-powered remote control devices to perform in particular remote control of apparatuses.

Self-powered devices according to embodiments of the invention can be two-way and comprise a receiver that receives information when mechanical energy is applied to the piezoelectric element. Such devices can have a synchronization cycle with a remote transmitter. For example, on a command, the device sends information to indicate that it is ready to receive, and the remote transmitter then sends information back to the self-powered remote control device.

What is claimed is:

1. A self-powered remote control device comprising:
   transmission means for transmitting a signal for controlling an electrical apparatus;
   a power conditioning circuit connected to the transmission means;
   an electric power generator comprising at least one piezoelectric element for supplying electric power to the power conditioning circuit;
   control means for controlling the electric power generator, comprising:
   striking means for generating a calibrated amount of mechanical energy for striking the piezoelectric element with a predetermined second force, thereby mechanically stressing the piezoelectric element to generate electric power; and
   actuating means actuatable by a first force for actuating said striking means, wherein a magnitude of the second force is not a function of a magnitude of the first force, wherein
   the piezoelectric element comprises a housing, a flexible metal support and a pad of piezoelectric material located on one face of said support, and the flexible metal support is loosely held within the housing.

2. The device according to claim 1, wherein the power conditioning circuit comprises electric power storage means for storing electric power supplied by the piezoelectric element.

3. The device according to claim 1, wherein the means for generating a calibrated amount of mechanical energy comprises a portion for traversing a predetermined distance and is for striking the piezoelectric element according to said predetermined distance.

4. The device according to claim 3, wherein the means for generating a calibrated amount of mechanical energy comprise at least one spring leaf having two stable states to cause a calibrated movement of a striker when said spring leaf transitions between said two states.

5. The device according to claim 1, wherein the control means is for striking the piezoelectric element on a side opposite the pad.

6. The device according to claim 1, further comprising a seal and a housing having a rim confronting a face of said flexible metal support, wherein the flexible metal support is secured in the housing by means of the seal located between the rim and the support.

7. The device according to claim 1, wherein the piezoelectric material of the pad is made of material selected from the group consisting of ceramic and a copolymer.

8. The device according to claim 1, wherein the piezoelectric element has a mechanical resonance for increasing the duration of electric power supply to the power conditioning circuit.

9. The device according to claim 2, wherein the means for storing electric power comprise at least one electric capacitor, the capacity of the storage means being between 0.4 and 50 microfarads.

10. The device according to claim 9, wherein the capacity of the storage means has a value between 2 and 10 microfarads.

11. The device according to claim 1, further comprising electric power management means connected to the power conditioning circuit for controlling an initialization and encoding phase and a transmission phase.

12. The device according to claim 1, wherein the transmission means comprise emitter means and receiver means.

13. The device according to claim 1, wherein the transmission means comprise emitter means supplied by an output port of an integrated circuit.

14. The device according to claim 1, further comprising storage means connected to the transmission means.

15. The device according to claim 1, further comprising counting means connected to the transmission means.

16. The device according to claim 1, wherein the transmission means comprise transmission condition checking means.

17. An apparatus comprising a self-powered remote control device comprising:
   transmission means for transmitting a signal for controlling an electrical apparatus;
   a power conditioning circuit connected to the transmission means;
   an electric power generator comprising at least one piezoelectric element for supplying electric power to the power conditioning circuit;
   control means for controlling the electric power generator, comprising:
   striking means for generating a calibrated amount of mechanical energy for striking the piezoelectric element with a predetermined second force, thereby mechanically stressing the piezoelectric element to generate electric power;
   actuating means actuatable by a first force for actuating said striking means, wherein a magnitude of the second force is not a function of a magnitude of the first force; and
   a mechanical actuating means, said mechanical actuating means for actuating the control means for controlling the power generator.

18. The apparatus according to claim 17, wherein the apparatus is an electrical switchgear apparatus having any of open, closed, tripped or loaded states, wherein said mechanical actuating means is for actuating the control mans according to the state of said switchgear apparatus.

19. The apparatus according to claim 17, wherein the transmission means is for emitting signals usable for performing logic selectivity.

20. The apparatus according to claim 17, wherein the transmission means is for emitting signals usable for performing differentiated annunciation.

21. The apparatus according to claim 17, wherein the transmission means is for emitting signals representative of a number of operations of said apparatus.

22. The apparatus according to claim 17, wherein the apparatus is an electrical control apparatus mechanical actuating means for being actuated by an operator.

23. The apparatus according to claim 17, wherein the apparatus is an electrical control apparatus comprising mechanical actuating means for being actuated by movement of a mechanical device.

24. An electrical installation comprising at least one self-powered remote control device according to claim 1 and high-frequency receiver means for receiving signals, said receiver means for receiving signals emitted by said at least one self-powered remote control device.

25. The electrical installation according to claim 24, further comprising at least one electrical cabinet containing at least one self-powered remote control device according to claim 1 and an automatic control circuit connected to, and controlling the receiver means for receiving signals.

26. An electrical installation comprising at least one apparatus according to claim 17 and high-frequency receiver means for receiving signals, said receiver means for receiving signals emitted by at least one said self-powered remote control device.

* * * * *